United States Patent
Gryphon et al.

(10) Patent No.: US 6,233,537 B1
(45) Date of Patent: May 15, 2001

(54) WORKFLOW MODELING LANGUAGE

(75) Inventors: Robert L. Gryphon, Polson, MT (US); Michael R. Clements, San Carlos; Kira R. Makagon, San Francisco, both of CA (US)

(73) Assignee: E.piphany, Inc., San Mateo, CA (US)

( * ) Notice: Subject to any disclaimer, the term of this patent is extended or adjusted under 35 U.S.C. 154(b) by 0 days.

(21) Appl. No.: 09/501,325

(22) Filed: Feb. 9, 2000

Related U.S. Application Data (60) Provisional application No. 60/126,456, filed on Mar. 26, 1999.

(51) Int. Cl.[7] .................................................... G06F 17/50
(52) U.S. Cl. ........................ 703/1; 703/6; 705/7; 707/100
(58) Field of Search .............................. 703/1, 2, 6; 705/7, 705/8, 9, 10; 707/102, 103, 104

(56) References Cited

U.S. PATENT DOCUMENTS

| | | | |
|---|---|---|---|
| 5,734,837 | * | 3/1998 | Flores et al. ............................... 705/7 |
| 5,768,506 | * | 6/1998 | Randell ................................. 709/202 |
| 5,980,096 | * | 11/1999 | Thalhammer-Reyero ........... 707/100 |

OTHER PUBLICATIONS

Torode, "High Octane E–commerce solution", Computer Reseller News, p. 54 (Mar. 29, 1999).*

Tan et al, "Improving the Reusability of Program Specification through Data Flow Modeling", IEEE Fifth International Conference on Computing and Information, pp. 479–483 (May 1993).*

Lang et al, "Modeling Business Rules with Situation/Activation Diagrams", IEEE Proceedings of the 13th International Conference on Data Engineering, pp. 455–464 (Apr. 1997).*

Gruhn et al, "Workflow Management based on Process Model Repositories", IEEE Proceedings of the 1998 International Conference on Software Engineering, pp. 379–388 (Apr. 1998).*

Riemer, "A Process–Driven, Event–Based Business Object Model", IEEE Proceedings of the Second International Enterprise Distributed Object Computing Workshop, pp. 68–74 (Nov. 1998).*

Mendelson, "Diagramming Tools", PC Magazine, p. 178 (downloaded text)(Feb. 1996).*

Torode, Christina, Computer Reseller News, "High Octane E–commerce solution", Mar. 29, 1999, (1999 CMP Media Inc.).

Holt, Stannie, InfoWorld, "Relationship management unites on Web", Mar. 29, 1999, (1999, InfoWorld Media Group).

(List continued on next page.)

Primary Examiner—Kevin J. Teska
Assistant Examiner—Samuel Broda
(74) Attorney, Agent, or Firm—Skjerven Morrill MacPherson LLP.; Fabio E. Marino; Paul E. Lewkowicz (57) ABSTRACT

A modeling system for the visual presentation of business applications (process, information, control, and channel), composed of multiple plan elements, is disclosed. The modeling system consists of a modeling language organized around a small set of defined pictograms each capable of representing elements of the application in progressively finer levels of detail. Each element primitive, be it a plan, step, data object, translation map, or control element (such as a business rule), is independently adjustable. Each element can be modified or enhanced without damage to the overall process because they are functionally decoupled and each represents a delegation of a task primitive (including data storage). All of the other, connected primitives are aware simply of what is passed into or taken out of a neighbor primitive, not how that primitive accomplishes its task.

27 Claims, 10 Drawing Sheets

OTHER PUBLICATIONS

Holt, Stannie, InfoWorld, "Relationship management unites on Web", Mar. 26, 1999, (1999, InfoWorld Media Group).

Sweat, Jeff, Information Week, "Web Ties That Bind—A New Breed Of Web Applications Focuses On Managing Companies' Complete Relationships With Their Customers", Mar. 22, 1999 (1999, CMP Media Inc.).

Sweat, Jeff, Information Week, "Web ties that bind", Mar. 22, 1999 (1999 UMI, Inc.; ABI/INFORM) (CMP Media Inc. 1999).

Karpinski, Richard, InternetWeek, "Customer Service Gets Online Boost", Mar. 22, 1999 (1999 CMP Media Inc.).

PR Newswire, "Octane Software (TM) Introduces First Multi–Channel Front Office Application Built for E–Business; Octane 99 (TM) Addresses the Next Generation in Customer Care for The 'Digital 1000' (TM)", Mar. 22, 1999 (1999 PR Newswire Association, Inc.).

PR Newswire, "Octane Software (TM) to Make Industry Debut at Customer Relationship Management/Support Services Conference & Expo; New Front Office Vendor to Launch First Customer Care Solution For Digital 1000", Mar. 17, 1999 (1999 PR Newswire Association, Inc.).

PR Newswire, Amazon.com Ranks #1 in Customer Care in Online Booksellers Study; Sponsored by Octane Software (TM), SupportZone.com(TM) Study Reveals Better–Than–Average Online Service at Top Sites, With Strong Showing from Newer Market Entrants, Mar. 9, 1999 (1999 PR Newswire Association, Inc.).

PR Newswire, Octane Software (TM) Reinvents Customer Care for the E–Business Economy; Industry Pioneers Form New Front Office Venture to Address the Needs of The Digital 1000(TM), Feb. 16, 1999 (1999 PR Newswire Association, Inc.).

PR Newswire, Octane Software (TM) Launches SupportZone.com(TM); Interactive site Dedicated to Helping Businesses Meet the Internet Service Challenge, Feb. 16, 1999 (1999 PR Newswire Association, Inc.).

PR Newswire, Octane and Sapient Announce Partnership to Deliver E–Customer Care Applications and Services to the Digital 1000; Alliance Combines Sapient's Award–Winning Internet Consulting With Octane's Innovative Front Office Application for E–Business, Feb. 16, 1999 (1999 PR Newswire Association, Inc.).

* cited by examiner

WORKFLOW MODELING LANGUAGE

CROSS-REFERENCE TO RELATED APPLICATION

The present application claims priority from provisional patent application Ser. No. 60/126,456, filed on Mar. 26, 1999, now pending, which is incorporated herein by reference in its entirety.

BACKGROUND OF THE INVENTION

1. Field of the Invention

The present invention relates to workflow and process modeling systems for business planning, more specifically, visually oriented modeling.

2. Related Art

Modeling languages for describing process or information flow are known in the art. One example is Unified Modeling Language (UML) used in computer-aided software engineering (CASE). Visual BML is specifically designed to model business logic, not program logic.

Furthermore, modeling systems in the prior art typically require a computer system to represent the process modeled and to show dependencies and information flows. These models are large, complex, and not often adaptable to changes. For example, a small change in one part of the flow chart often throws off the time sequence of events and data dependencies elsewhere.

Prior art models are also presented in a time sequence, as in a flow chart, with a defined "beginning" and a certain "end." Actual business processes, such as a response to a phone call from a customer requesting information or a service, do not effectively operate in a strict time sequence because the request (or "input" from the customer) is not readily predictable as to what it will be or when it will come in. Such business processes are commonly known as event-driven processes; the processing in response to an event is referred to as "event-driven processing."

What is needed, and contemplated herein, is a method of representing a concrete business process in terms usable and understandable without a computer. Furthermore, such a method must model multiple potential branches based on unpredictable, non-time-sequenced inputs. This modeling must also be readily adjustable to tailor individual planned responses without disturbing the overall model.

SUMMARY OF THE INVENTION

A modeling system for the visual presentation of event-driven business processes, composed of multiple plan elements, is provided. The modeling system consists of a modeling language using a small set of defined pictograms (symbols) capable of representing elements of the process in progressively finer levels of detail. Each element primitive, be it a connection element, control element, business information element, or business process element, is independently adjustable. Each element can be modified or enhanced without damage to the overall process because each element represents a delegation of a task primitive (including data storage) and the abstraction models are loosely coupled. All of the other connected primitives are aware simply of what is passed into or taken out of a neighbor primitive, not how that primitive accomplishes its task.

Visual BML is different from ordinary flowcharting and data modeling in the following ways:

- Visual BML is modular. Each Visual BML diagram, referred to as a "plan," describes the attributes and relationships of a single planned process. Each symbol can be deployed (reused) within the plans for other symbols as appropriate.
- Visual BML describes business processes and business information, not just one or the other. It models both the nouns and verbs of the process description. The information model is independent of the process model. A set of related business process plans and business information plans is referred to as a "Business Model."
- Visual BML Business Models do not show the logic of business process flow through simple branching. Instead, sequences of steps are planned in advance (subject to the passage of business rules) and each step in turn describes the details of a lower-order business process.
- Visual BML is expressive and robust. It describes business processes and business information in enough detail to construct a software implementation of a business model, if desired.
- Visual BML is simple. The notation consists of the minimum number of simple symbols necessary to fully describe a business model. Business information is described hierarchically instead of relationally, although it is designed to be able to map onto a relational database where desired. This makes an understanding of the process intuitive.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates similar or identical items.

DETAILED DESCRIPTION OF THE INVENTION

Introduction

Definition of Visual BML

The present invention, in one embodiment known as Visual Business Modeling Language or Visual BML, is a method of graphical notation that can be used to represent business process knowledge and the corresponding business information that comprises the business model. Visual BML uses a collection of symbols to represent the various parts of the business model and provides a simple, reproducible mechanism for compiling, documenting, and reviewing these processes.

Uses of Visual BML

Visual BML can be used to describe and document any business process. Examples of its uses are for initial design or redesign, as part of a continuous improvement effort, for training purposes, or as a precursor to application design. As a business-modeling notation, Visual BML is not bound to any software or specific operating environment. It may be used to represent any business process diagram on whiteboards, paper, or a projected computer screen to facilitate group discussions.

The Visual BML notation is more than just an effective mechanism for capturing business process knowledge. It provides a framework to direct the investigation and recording of all aspects of the business model. The Visual BML notation can capture business information tracking requirements from high-level discussions down to the most detailed examination of the business model. It also provides a valuable means of communicating this information among high-level planners, analysts, process managers, and the designers of the systems that may be developed to track this information.

Because Visual BML is a semantically robust and complete representation of the business model, it can be compiled directly into an operating representation of the model. This operating representation can be used to operate the business processes on a computer.

Visual BML Usage

Visual BML symbols are defined and referenced by different types of users during business modeling. This section identifies how symbols are used, and the different types of users who employ them.

The interaction between these categories is shown in the usage matrix in Table 1.

Types of Usage

Contribute

Those who provide input into the definition of how a Visual BML symbol is used in a business process, but are not solely responsible for this definition, are said to contribute to the symbol definition.

Plan

Those who define the properties of a Visual BML symbol, and determine how it is used in a business process are said to plan the symbol.

Deploy

Those who use the Visual BML symbols defined by themselves or others are said to deploy the symbol.

Types of Users

Business Analyst

Business Analysts and other trained professionals use Visual BML to examine and document new or unfamiliar business processes. The language supports efforts to record high-level business-process knowledge, and as further analysis is completed, to record more detailed information for an eventual hand-off to other users.

Business Process Re-Engineering Specialist

Visual BML is ideal for cross-functional teams as they examine existing business processes during continuous improvement or measurement activities. It is an excellent way to facilitate group discussions. It is also an easy and informative way to record business modeling information in the meeting environment where it is identified.

Channel Specialist

The information recorded by Visual BML is invaluable to data repository and application designers who manage the contact channels that receive and exchange business process information with users, external applications, and information systems. Visual BML provides an effective way to see how the business model decomposes into low-level details, facilitating top-down design. This capability helps ensure the resulting systems provide the appropriate processing and measurements to manage all aspects of the business model.

TABLE 1

Visual BML Symbols and Their Intended Users

| Visdual BML Symbol | Business Analyst | Business Process Reengineering Specialist | Channel Specialist |
|---|---|---|---|
| Step | Plan and Deploy | Plan and Deploy | — |
| Action | Plan and Deploy | Contribute and Deploy | — |
| Business Rule | Plan and Deploy | Contribute and Deploy | Plan And Deploy |
| Event | Plan and Deploy | Plan and Deploy | — |
| Translation Map | Contribute and Deploy | — | Plan And Deploy |
| Business Information Object | Plan and Deploy | Contribute and Deploy | Contribute And Deploy |
| Attendant | Plan and Deploy | | |

Visual BML Symbols

Figure 1:
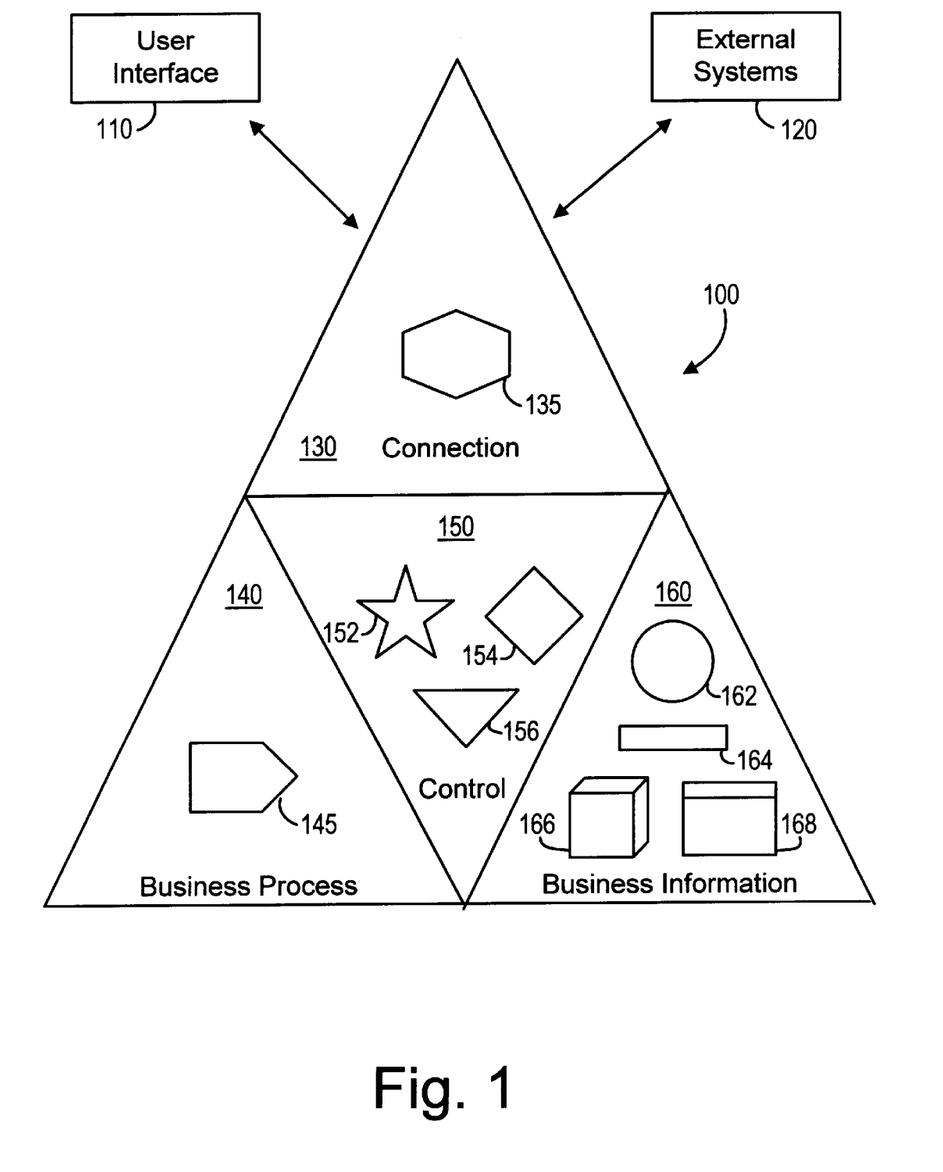
FIG. 1 is a diagram illustrating the interrelationships of the basis constructs of Visual BML, in accordance with an embodiment of the invention.

Visual BML uses specific symbols to document distinct aspects of business process knowledge and information tracking requirements. These elements may be thought of as existing in one of four interconnected quadrants, connection quadrant 130, business process quadrant 140, control quadrant 150 and business information quadrant 160. These quadrants are shown in FIG. 1, and are described in detail in subsequent sections of this document.

Business Process Quadrant

Business process quadrant 140 contains the individual "steps" that comprise a business process. It expresses the knowledge about what functions need to be performed to complete the business process. Business process quadrant 140 can be considered half of the "foundation" knowledge that is recorded by Visual BML.

Step

A Step symbol 145 represents a unit of business process, and it is used to organize and sequence the work that goes on. The work described by a Step may also be decomposed into a series of smaller, low-level Steps to provide increased detail.

Examples of a Step would be "Answer Incoming Call" or "Escalate Trouble Report."

Business Information Quadrant

Business information quadrant 160 contains the other half of the "foundation" information recorded by Visual BML. It represents the stored and derived data elements that are used during the operation and management of a business process.

Property

A Property 164 is used to depict the elementary units of business data as well as a description of how it is used within the business process.

Examples of a property 164 include "Customer Name," the resulting customer name returned from a query, or a value for a particular field such as "State or Province."

Business Information Object

A Business Information Object (BIO) 168 is used to depict a collection or group of basic properties, other business information objects, and/or matrices. BIO 168 includes a description of how the information included in a BIO is used within the business process. The information in a BIO is of fixed size.

Examples of a Business Information Object include "Customer" or "Business

Matrix

A Matrix 166 is used to depict a collection of basic properties, business information objects, or other matrices. A matrix is usually a list of BIOs 168. Matrix 166 includes a description of how the information included in the Matrix is used within the business process. The amount of information a Matrix 166 contains can be changed during the business process by adding or deleting rows of information.

Examples of a matrix might be "Products Purchased", the resulting list of products returned from a query or the resulting list of customers returned from a query, or a "pick-list."

Attendant

An Attendant 162 is used to check and alter data as any behavior (for example, reading or writing) is invoked on an information object.

Examples of an attendant's functions might be to make sure dates written to a repository are within a certain range or to make sure certain content is present in the data that is read or written.

Connection Quadrant

Connection quadrant 130 contains information about how the business process and data interact with external users, processes, and systems. Any inputs or outputs of the business process are represented within this quadrant.

Translation Map

A Translation Map (TransMap) symbol 135 is used to map the exchange of information between the Visual BML business model and the outside world. Such interactions might include receiving input or transmitting information via user interface 110, sending a message via electronic mail, storing information to an external data storage device 120, or invoking an application such as a search engine.

Control Quadrant

Control quadrant 150 is "centralized" and directs the flow of information among the other three quadrants. Any time information or instructions pass between any of the other three quadrants it is guided by the elements of the Control Quadrant.

Business Rule

A Business Rule symbol 154 represents the business intelligence used to make decisions during a business process. Business Rules are used to evaluate conditions and direct the "behavior" of other Visual BML symbols.

Examples of a Business Rule are "Is Customer Signed Up For Gold Level Support?" or "Has The Problem Been Resolved?".

Action

An Action symbol 156 represents how work is done whereas Step information indicates when and under what conditions the work is performed within a process. An Action is a bridge between business and program logic. Actions perform work while Steps coordinate the actions. An Action can also be composed of lower-level Actions that provide increased detail of exactly how the work is to be performed.

Actions can be essential actions that are predefined as constant components of Visual BML or they can be compound actions that are created by the user.

Examples of an Action would be "Retrieve Customer Information" or "Assign Call to Support Queue".

Catch Event

A Catch Event symbol 152 is used to represent an external event that initiates a portion of the business process. Events can trigger changes in the processing as well as the outcome of a business process by their association with Steps, Actions, and Translation Map symbols.

Examples of an Event include "Incoming Customer Call" or "Status Changed to 'Resolved'".

How to Use Visual BML

This section describes how to use Visual BML as a notation method during business process definition and analysis activities. Visual BML can be used to capture the business model characteristics during discussions as opposed to writing random notes during the "discovery" process and then attempting to "transcribe" them into Visual BML after the fact. The correct use of Visual BML during a discussion of a business model ensures a rigorous description of the model that facilitates the translation of the discussion into actual business data and processes.

There are numerous methods for using Visual BML notation to record business modeling knowledge. The following simplistic example provides an outline of how the Visual BML symbols may be used during the analysis of a typical call center's business process entitled "Incoming Customer Phone Call."

1. On a single sheet of paper use Step symbols to outline the business process. In this case, we may decide there are three separate Steps involved with processing an "Incoming Customer Phone Call":

Identify Customer

Review Entitlement

Address Customer Issue

Figure 2:
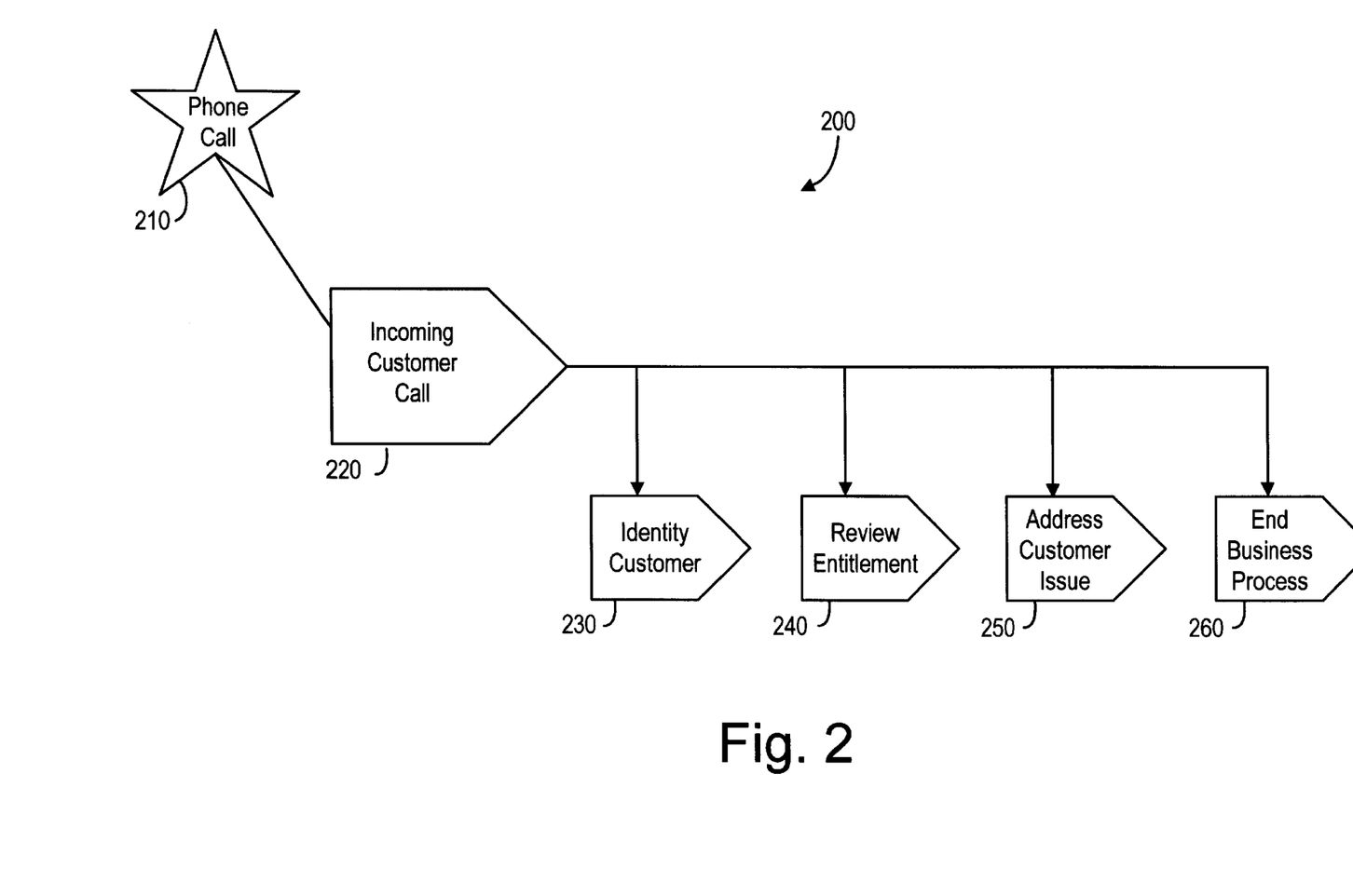
FIG. 2 is a diagram illustrating a process step with deployed steps and a catch event, in accordance with an embodiment of the invention.

2. For each of the identified Steps, we now determine whether an external event instigates that segment of the process, and if so, associate a Catch Event symbol with the corresponding Step. In our example, the customer calling on the phone is the event that initiates the entire process. Therefore, a Catch Event symbol 210 is associated with the primary Step "Incoming Customer Call" 220 to indicate that the telephone call is the event that begins the entire process being modeled.

For each of the Steps defined in FIG. 2, a more detailed analysis (involving more low-level Steps) needs to be performed. For the purposes of this example, we take "Identify Customer" Step 230 and examine it further. On another sheet of paper (FIG. 3) place "Identify Customer" Step 310 at the top left hand corner. In our process, searching in the customer database for their names (sub Step 320) identifies callers. If that fails, a search is performed by the company name (sub Step 340), and it is determined if the caller appears on the valid contact list. If they do not appear, the caller is given a list of valid callers who may report the issue for them, or the caller is directed to an alternate contact channel such as electronic mail. For each of the sub Steps outlined above, the process is repeated to record the next level of business process knowledge (if applicable).

Figure 3:
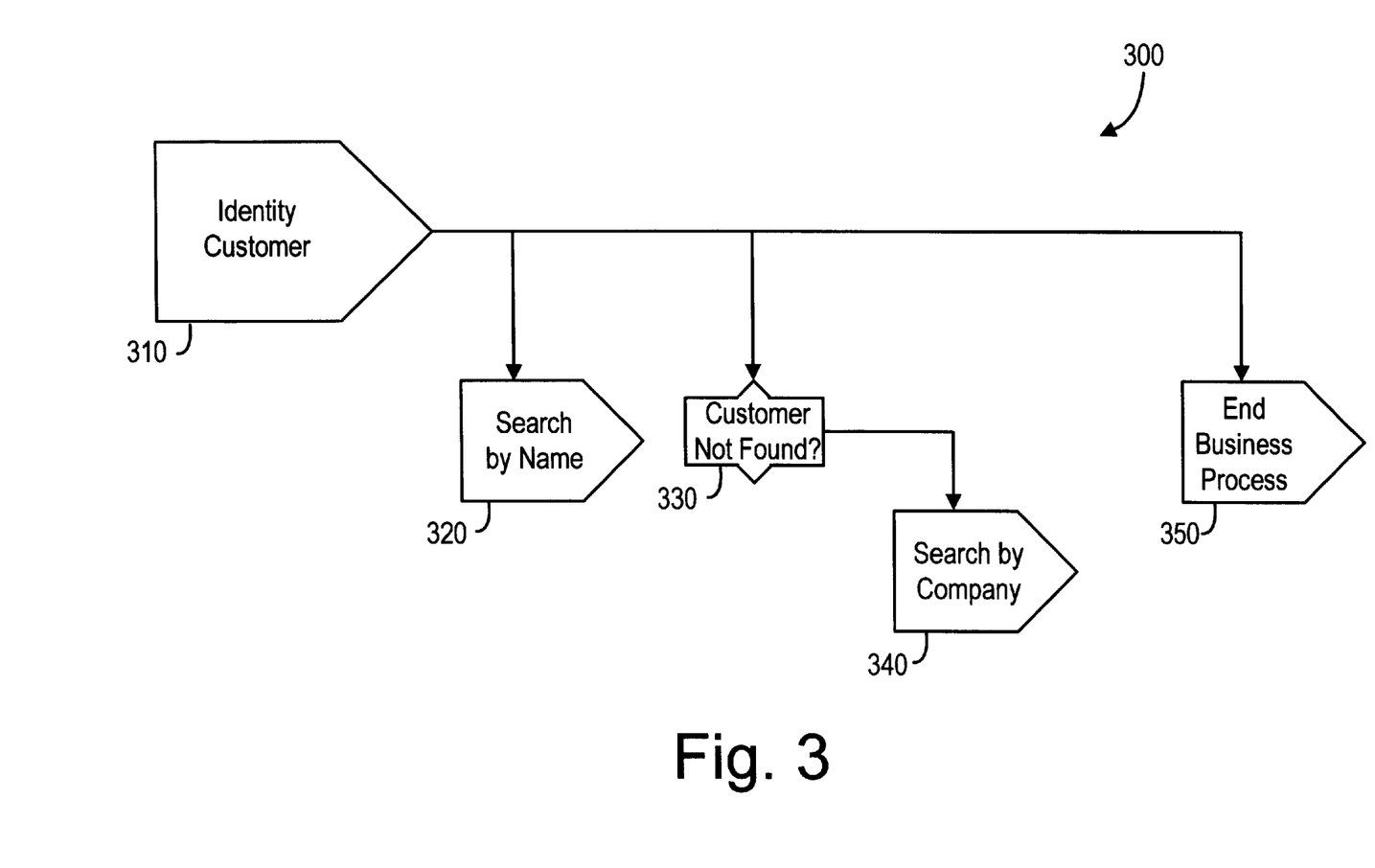
FIG. 3 is a diagram illustrating a process step with deployed steps and a business rule, in accordance with an embodiment of the invention.

3. Now, we determine where each decision is made during the process, and use a Business Rule symbol 330 to record this information. Each Business Rule checks a specific condition (represented as information in business information objects, matrices, and properties) to determine how further processing is to be completed. In our example, Step "Identify Customer" 310 has a single Business Rule in use: "Customer Not Found?" 330.

Figure 4:
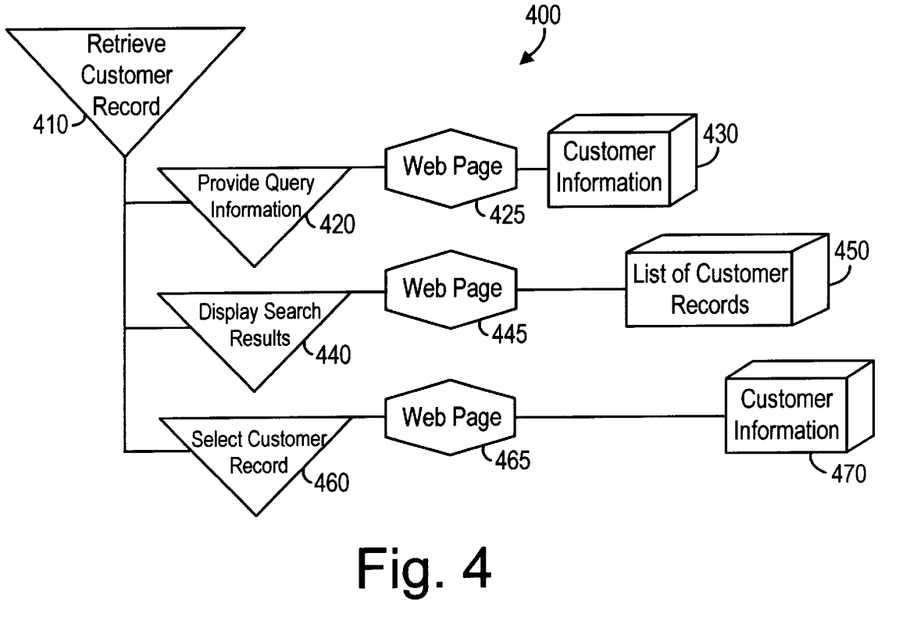
FIG. 4 is a diagram illustrating a reusable action with translation maps and business information objects, in accordance with an embodiment of the invention.

4. Next, we identify all Actions that occur during the business process, and associate the appropriate symbol with the Step where it is performed. For example, the low-level Step "Search By Name" 320 would have a corresponding Action (or set of Actions) to document exactly how this information is retrieved. In this case, a search is performed from a data storage device holding customer account information. This is shown in FIG. 4.

5. Now, we document each point where input into the process is required, or where information is exchanged with the outside world. These locations are indicated by the Action symbols 410, 420, 440 and 460 recorded previously. For each of these Actions, a Translation Map symbol 425, 445, or 465 is associated to describe how the information is to be received or exchanged. To complete our example, a "Retrieve Customer Record" Action 410 is associated with the "Search By Name" Step 320 to indicate that a database query is performed.

Figure 5:
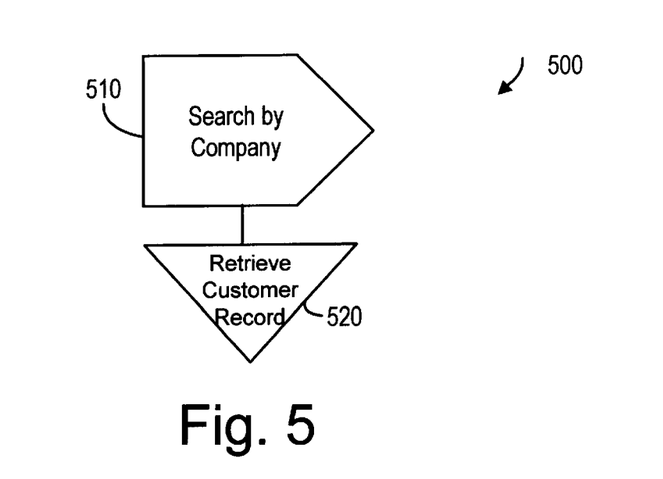
FIG. 5 is a diagram illustrating a process step with a reused action, in accordance with an embodiment of the invention.

6. Since the Action we defined earlier is likely to be performed in numerous places within the business model, we define it once as shown in FIG. 4, and then deploy it as part of the "Search by Name" Step 510, as shown in FIG. 5.

7. Finally, we record the specific data elements that are tracked or processed during each step, and we record this information using Business Information Objects. This is shown in FIG. 4.

Figure 6:
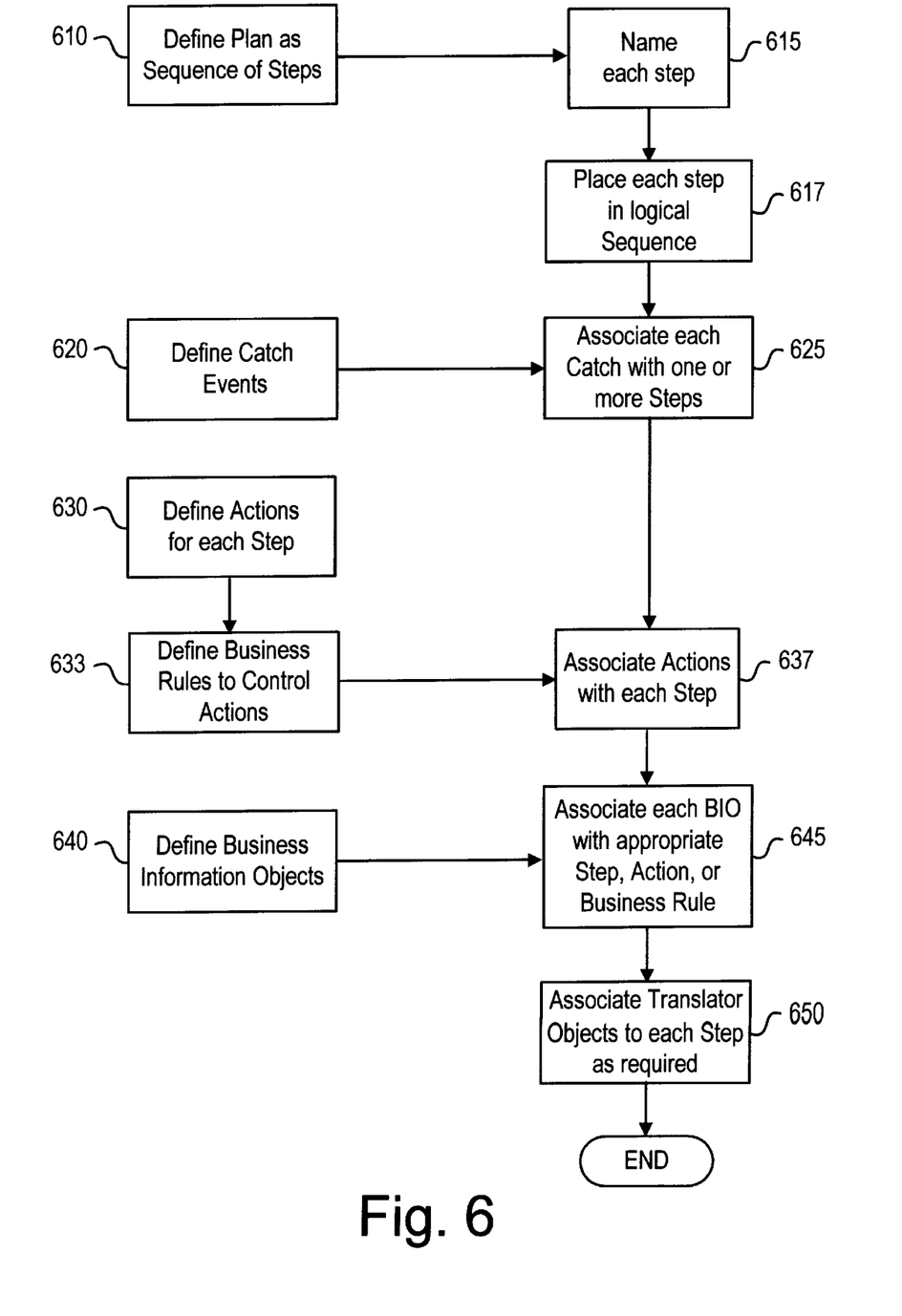
FIG. 6 is a flow diagram illustrating a method for generating a business model of a business process, in accordance with an embodiment of the invention.

This process is more formally described in the flow diagram of FIG. 6.

In FIG. 6, a Plan is first defined as a sequence of Steps in stage 610. Each Step is then assigned a name in stage 615 and placed in a logical sequence in stage 617. A series of Catch Events is defined in stage 620. In stage 625, each Catch Event is associated with one or more of the Steps defined in stage 610. A set of Actions is defined in stage 630 for each of the Steps and a set of Business Rules to control the Actions is defined in stage 633. In stage 637, the Actions defined in stage 633 are associated to the Steps defined in stage 610. A set of Business Information Objects are defined in stage 640. The Business Information Objects defined in stage 640 ate then associated with appropriate Steps, Actions, or Business Rules in stage 645. Finally, in stage 650, Translator Objects are associated with each Step defined in stage 610, as needed.

Those skilled in the art realize that the stages of the flow diagram of FIG. 6 can be performed in an arbitrary order, unless otherwise indicated in the flow diagram. For example, stages 610, 620 and 630 can be performed in any order, while stage 610 is performed prior to stage 615. Accordingly, the invention is not limited to the specific order of the stages illustrated in FIG. 6.

Visual BML Documents

The business workflow model enables business analysts to design and maintain the three dimensions of a business application; namely business models, data structures, and communication channel presentations. The business workflow model is partitioned into business model documents. A Visual BML Business Model document consists of one or more Visual BML Plans. In Visual BML, a Plan is one page containing a Plan symbol and its relations.

While it is probably easier to keep all plans for a given process in the same document, there are many circumstances when it becomes necessary to spread the plans into multiple documents. For example, the channel designer may have one file with all the translation maps in it; the business analyst another file with the business step definitions.

There is no limit to the number of documents one can use to create a process. The various symbols used in Visual BML can be implemented in a computer drawing environment.

Figure 7:
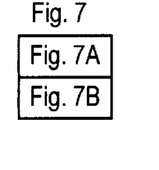
FIG. 7 shows a complete stencil for Visual BML, intended for use by advanced developers, in accordance with an embodiment of the invention.
Figure 7A:
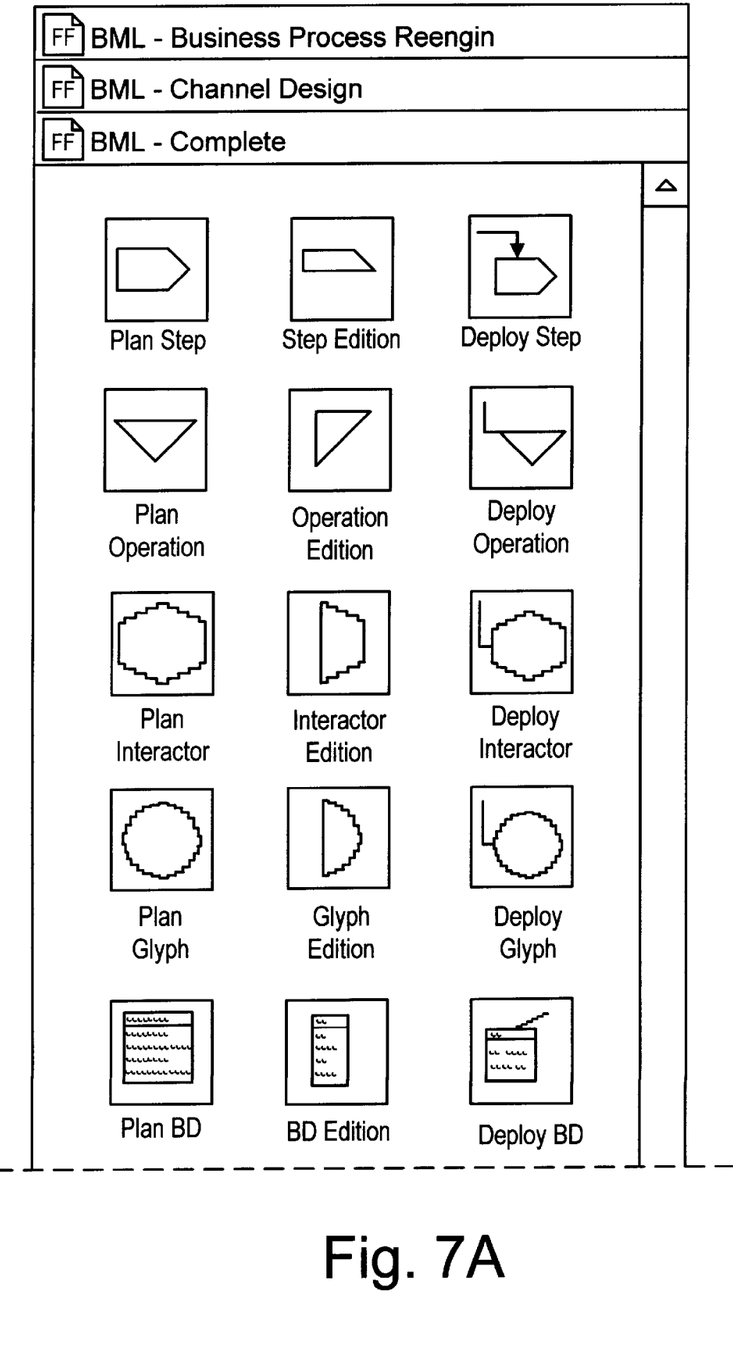
Figure 7B:
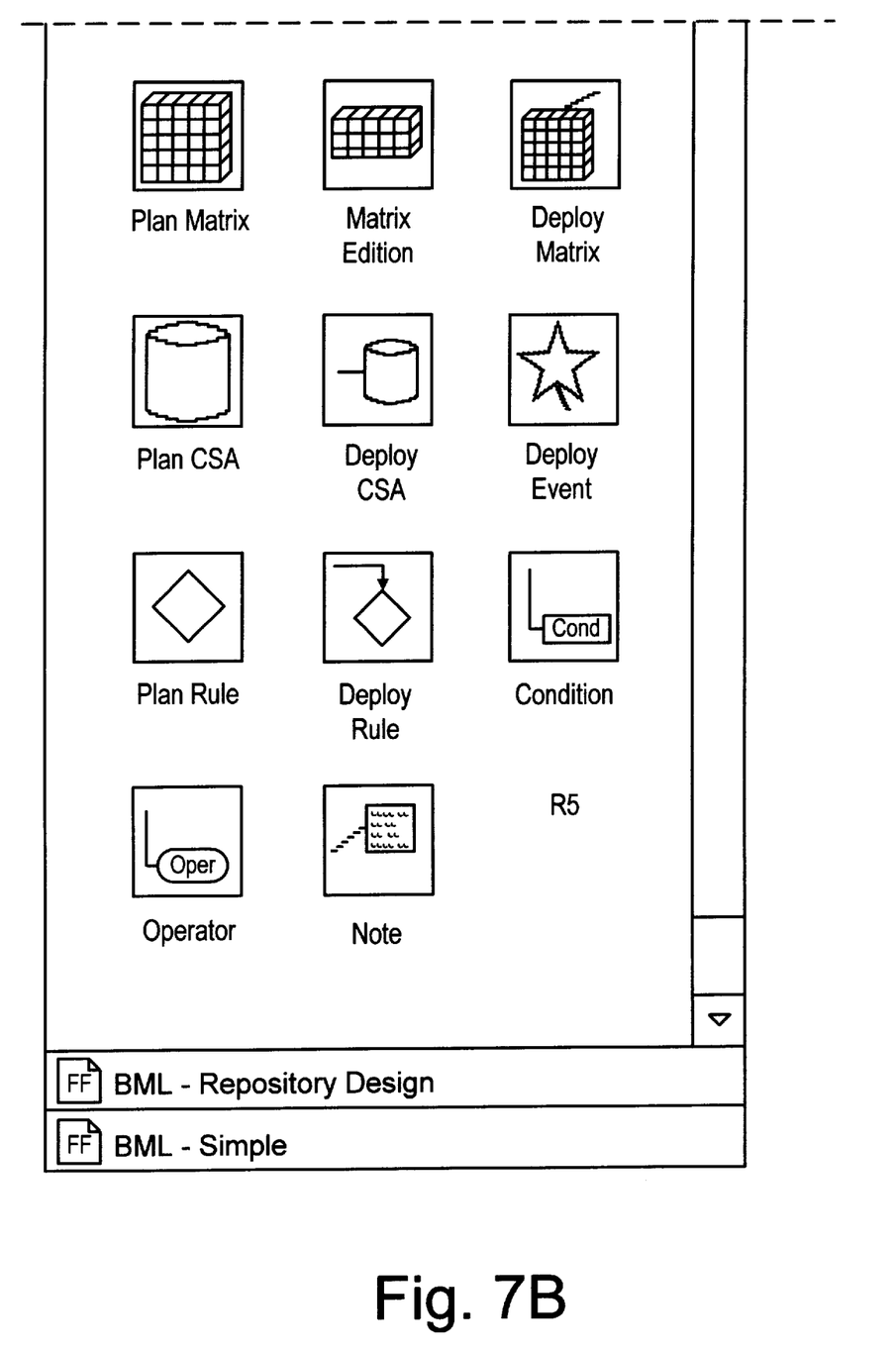
Figure 8:
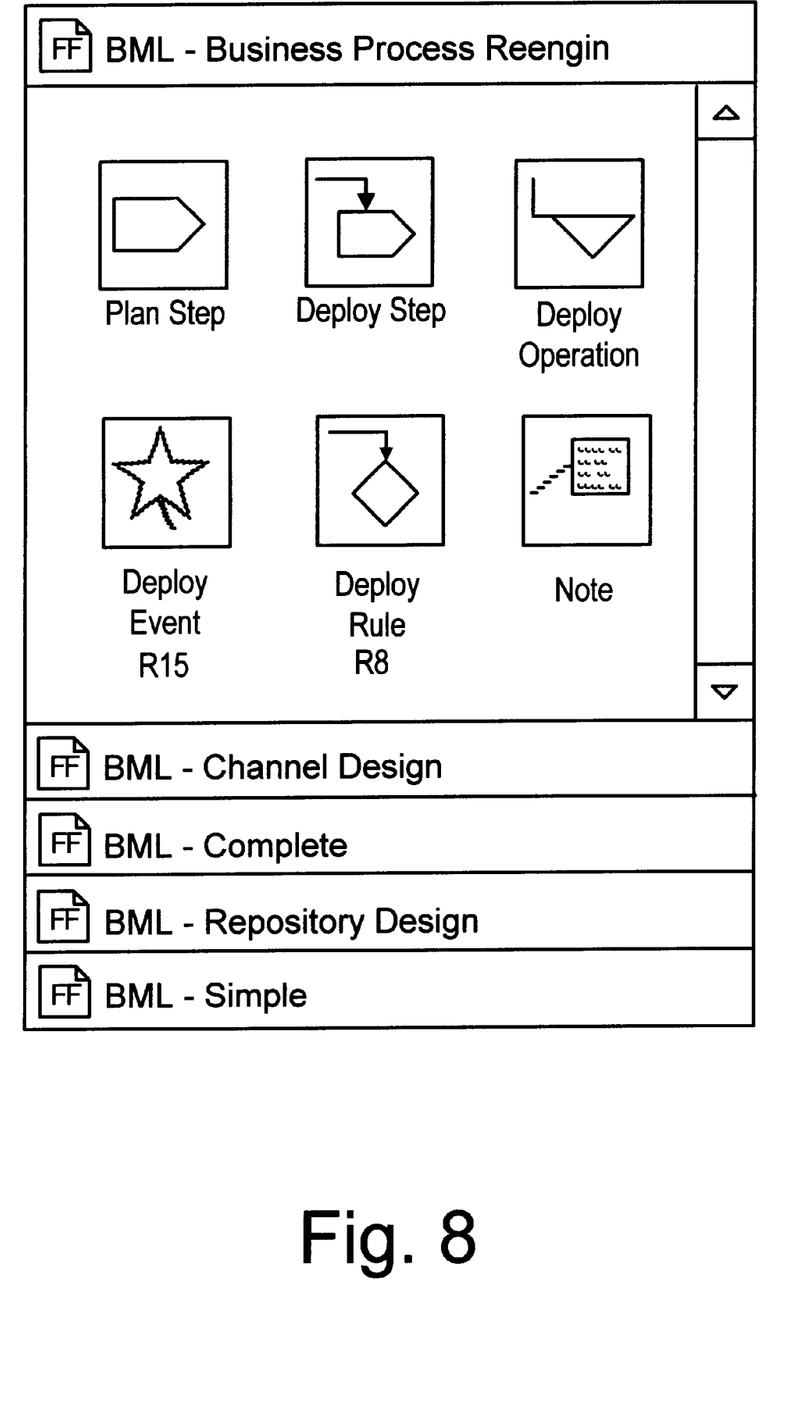
FIG. 8 illustrates Visual BML symbols designed for a high-level business analyst, in accordance with an embodiment of the invention.
Figure 9:
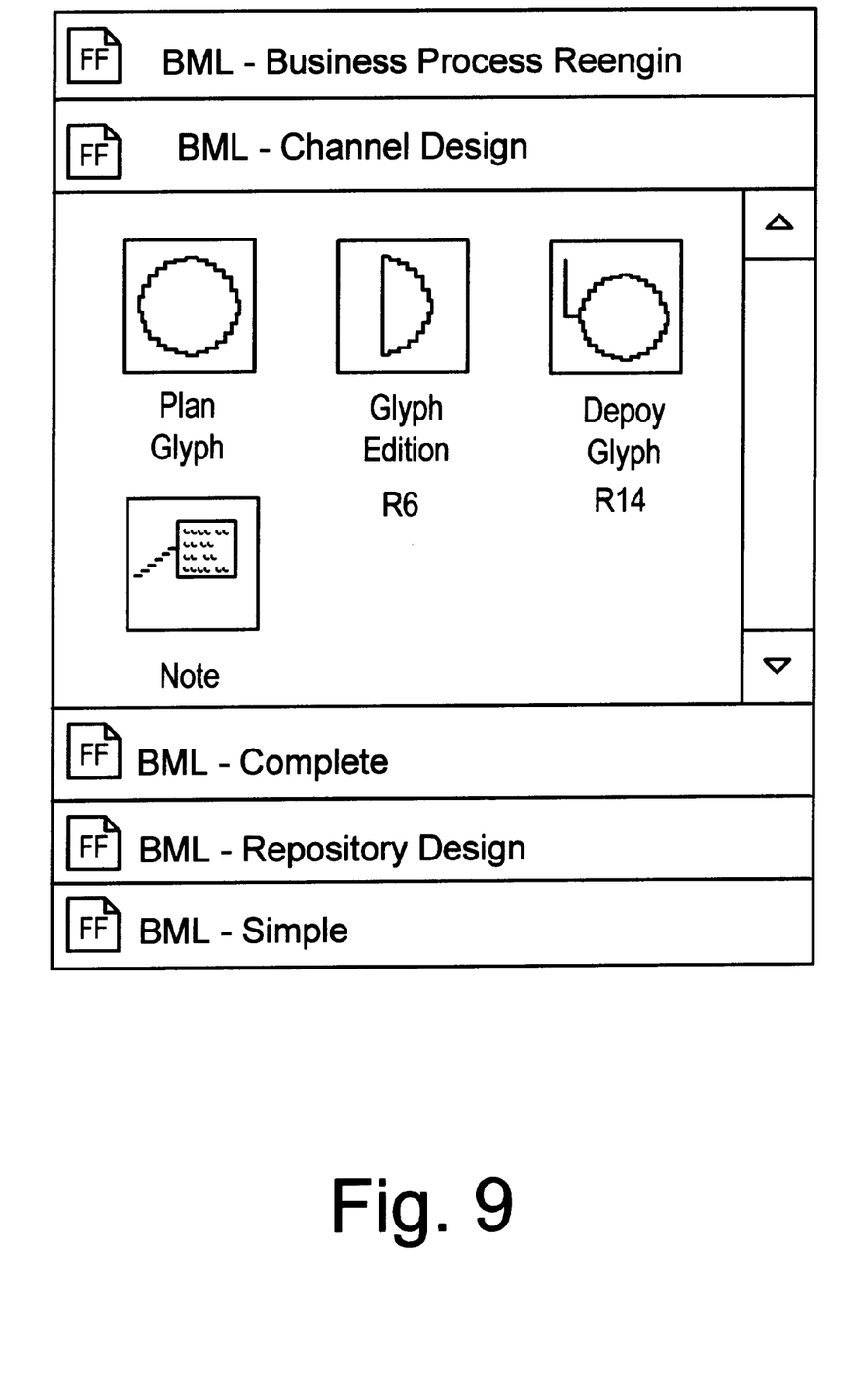
FIG. 9 shows a channel designer's stencil, in accordance with an embodiment of the invention.
Figure 10:
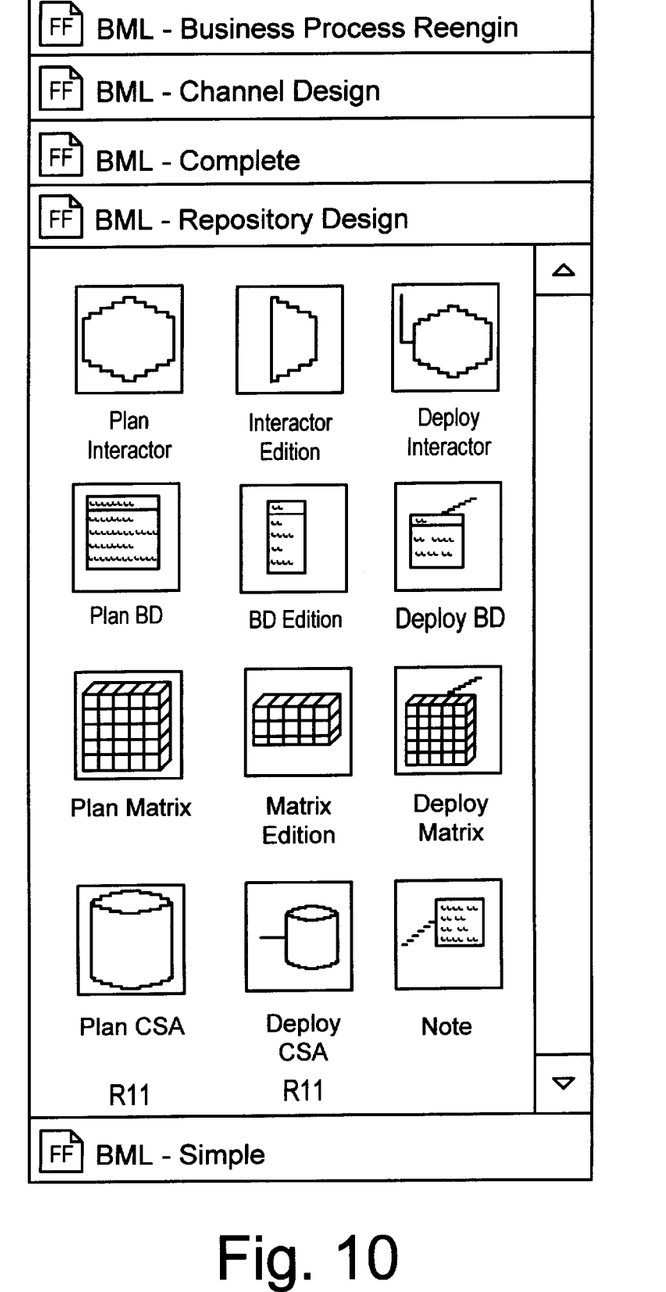
FIG. 10 shows a business process re-engineering specialist's stencil, in accordance with an embodiment of the invention.

FIG. 7 shows the complete stencil for Visual BML, intended for use by advanced developers. FIG. 8 contains the Visual BML symbols needed by a high-level business analyst. FIG. 9 shows the channel designer's stencil. FIG. 10 shows the business process re-engineering specialist's stencil. The user employs special VISIO templates and stencils to create the business process model, using symbols that represent objects within the system. By employing these templates and stencils, any user can create powerful, flexible business models.

Although a visual modeling language based on particular stencils and templates is described, those skilled in the art will realize that the present visual business modeling language can be implemented in drawing software environments other than VISIO. Furthermore, those of ordinary skill in the art will appreciate that the present invention is not limited to computer-based implementations: hand-drawn models (as with pen and ink on paper or chalk on a blackboard) are also within the scope of the present invention. Accordingly, the invention is not limited to any particular implementation of the present modeling language.

Comparing Visual BML with Other Methods

Flowcharting

With few exceptions, flowcharting is a manual method of recording business-modeling information. Unfortunately, flowcharting is an independent activity that is neither modular nor robust and does not readily lend itself to the development of applications and systems to automate the process. Flowcharting is procedural, not event driven. Visual BML covers not only process, but also information, channels, and control.

In contrast, the Visual BML notation is specifically designed to guide the investigation process, to capture all associated knowledge about the business model, and to provide a means of communicating this knowledge among the various analysts and continuous improvement specialists that drive automation projects. For example, the portion of the business model represented by an Action and its corresponding Properties, Translation Maps, and Business Information Objects defines the business information that will be encoded into a programmatic procedure in an application. Visual BML uses the business process modeling effort to drive data repository and application requirements. This capability ensures that the delivered automation components accurately reflect and provide the necessary functionality to manage the underlying business process.

Fourth Generation Languages

Fourth Generation Languages, commonly referred to as 4GLs, are frequently used to develop database applications with the intention of automating certain business processes. Although 4GLs provide a good working environment that is well suited to the task, the problem with them is that developers lose some measure of programmatic control by using the provided high-level constructs. Worse yet, with 4GLs there is no way to guarantee that the resulting application is closely tied to the business process it is attempting to automate. Few business analysts can use 4GLs-Visual BML is pictorial and therefore more intuitive. 4GLs do not distinguish between program and business logic while Visual BML is specifically constructed to model business activity.

Visual BML solves all of 4GL's shortcomings by using the business modeling activity to capture the high-level and detailed automation requirements. The Visual BML notation helps analysts, improvement teams, and channel specialists thoroughly examine the underlying business process. It also makes it easy to identify areas that may be improved through system automation. Visual BML helps ensure that the design of the system or application is directly driven by the business requirements which in turn leads to the development of systems that can be used to efficiently manage the business process.

With very little interpretation, Visual BML can be directly mapped to the application that reflects the business model. Thus, Visual BML solves the problems associated with both 4GLs and flowcharting.

The Documentation and Training Bonus

Visual BML also provides exceptional value during the deployment of information tracking applications.

As stated previously, it is often very difficult to tie the functionality delivered in an application back to the business process. As a result, most documentation projects simply describe the potential values for each data field, and the purpose and effect of each button and menu item.

Visual BML not only supports efforts to document the application, it delivers the most important type of documentation possible: the proper context of how the application is to be used within the business model. Thus, Visual BML becomes an integral part of the entire business modeling lifecycle from process analysis, to the design and delivery of automation components, to the eventual training of personnel to use these systems to automate and manage the underlying business processes.

Representative Embodiment

Octane Studio is an implementation of Visual BML. A plan page represents each object in the business system. A plan page consists of a single plan symbol and deployed symbols.

Each plan page is saved and transformed into metadata. A plan symbol is represented as a large symbol, and smaller symbols represent deployments of planned symbols from other plan pages. The page's plan symbol defines the properties and behaviors of the object; the deployed symbols are placeholders that represent deployments of their respective objects, but do not themselves contain any object attributes.

Beyond the plan symbol, the remaining contents of a plan page define the characteristics of the planned object. For example, a step object is defined with a plan step symbol of the same name within its own VISIO document, but may be referenced by its deployed step symbol within the definitions of other steps that contain it. There exists only one plan symbol for each object in the system, but many deployed symbols may exist to represent it.

As a Business Model moves through its process, it constructs a Context. A Context maintains the following:

All business data (properties, business information objects, and matrices) currently active A record of the Steps which have been visited The data touched in each Step, The results of Business Rules consulted The Actions which were taken The return codes of Actions which failed and any other information that is pertinent to the Business Model.

Visual BML models are stateless, and their implementation is also stateless. The Context is the runtime state collector. It contains all the state information relevant to a user running a Visual BML process.

Alternate Embodiments

While particular embodiments of the present invention have been shown and described it will be apparent to those skilled in the art that changes and modifications may be made without departing from this invention in its broader aspect and, therefore, the appended claims are to encompass within their scope all such changes and modification as fall within the true spirit and scope of this invention.

We claim:

1. A method for generating a business model of a business process to be used in a computer system by defining a plan having a plurality of steps, said method comprising:

for each of said steps, naming said step;

placing each of said named steps in a logical sequence;

defining zero or more triggering events;

associating each said triggering event with at least one of said named steps;

defining one or more actions to be performed in each of said named steps, wherein each of said actions are controlled by one or more rules;

associating zero or more business information objects with any of said named steps, said actions, or said rules;

representing a plurality of interfaces with external entities using one or more translation map objects;

associating said translation map objects with one or more of said named steps; and expressing said plan as a combination of said named steps, said logical sequence, said triggering events, said actions, said business information objects, and said translation map objects using a predefined graphic symbol library;

wherein the business model provides an adjustable, graphic representation of the business process.

2. The method of claim 1, wherein said plan is reusable in whole or in part.

3. The method of claim 1, wherein said generating a business model uses a medium selected from the group consisting of a computer system, a writing surface, a paper, a blackboard, and a whiteboard and wherein said computer system comprises a storage device.

4. The method of claim 3, further comprising saving said business model in said storage device in a predefined format.

5. The method of claim 1, wherein each of said actions further comprise essential and compound actions, said essential actions further comprise assign, retrieve, gather, save, throw event, render, populate, and script actions; and said compound actions are defined by a user.

6. The method of claim 1, wherein each of said business information objects further comprise a table.

7. The method of claim 1, wherein each of said business information objects further comprises a matrix.

8. The method of claim 1, wherein each of said translation map objects further comprises a property describing channel interface information.

9. The method of claim 1, wherein said predefined graphic symbol library comprises one or more computer-aided drawing templates.

10. A computer system for generating a business model of a business process to be used in a computer system by defining a plan having a plurality of steps, said computer system comprising a computer and a computer program, said computer program comprising computer instructions for:

for each of said steps, naming said step;

placing each of said named steps in a logical sequence;

defining zero or more triggering events;

associating each said triggering event with at least one of said named steps;

defining one or more actions to be performed in each of said named steps, wherein each of said actions are controlled by one or more rules;

associating zero or more business information objects with any of said named steps, said actions, or said rules;

representing a plurality of interfaces with external entities using one or more translation map objects;

associating said translation map objects with one or more of said named steps; and expressing said plan as a combination of said named steps, said logical sequence, said triggering events, said actions, said business information objects, and said translation map objects using a Redefined graphic symbol library;

wherein the business model provides an adjustable, graphic representation of the business process.

11. The computer system of claim 10, wherein said plan is reusable in whole or in part.

12. The computer system of claim 10, wherein said generating a business model uses an additional medium selected from the group consisting of a writing surface, a paper, a blackboard, and a whiteboard and wherein said computer system comprises a storage device.

13. The computer system of claim 12, further comprising saving said business model in said storage device in a predefined format.

14. The computer system of claim 10, wherein each of said actions further comprise essential and compound actions, said essential actions further comprise assign, retrieve, gather, save, throw event, render, populate, and script actions; and said compound actions are defined by a user.

15. The computer system of claim 10, wherein each of said business information objects further comprise a table.

16. The computer system of claim 10, wherein each of said business information objects further comprises a matrix.

17. The computer system of claim 10, wherein each of said translation map objects further comprises a property describing channel interface information.

18. The computer system of claim 10, wherein said predefined graphic symbol library comprises one or more computer-aided drawing templates.

19. A computer-readable storage medium comprising program code to be used with a computer for generating a business model of a business process to be used in a computer system by defining a plan having a plurality of steps, said program code comprising instructions for:

for each of said steps, naming said step;

placing each of said named steps in a logical sequence;

defining zero or more triggering events;

associating each said triggering event with at least one of said named steps;

defining one or more actions to be performed in each of said named steps, wherein each of said actions are controlled by one or more rules;

associating zero or more business information objects with any of said named steps, said actions, or said rules;

representing a plurality of interfaces with external entities using one or more translation map objects;

associating said translation map objects with one or more of said named steps; and expressing said plan as a combination of said named steps, said logical sequence, said triggering events, said actions, said business information objects, and said translation map objects using a predefined graphic symbol library;

wherein the business model provides an adjustable, graphic representation of the business process.

20. The computer-readable storage medium of claim 19, wherein said plan is reusable in whole or in part.

21. The computer-readable storage medium of claim 19, wherein said generating a business model uses a medium selected from the group consisting of a computer system, a writing surface, a paper, a blackboard, and a whiteboard and wherein said computer system comprises a storage device.

22. The computer-readable storage medium of claim 21, further comprising saving said business model in said storage device in a predefined format.

23. The computer-readable storage medium of claim 19, wherein each of said actions further comprise essential and compound actions, said essential actions further comprise assign, retrieve, gather, save, throw event, render, populate, and script actions; and said compound actions are defined by a user.

24. The computer-readable storage medium of claim 19, wherein each of said business information objects further comprise a table.

25. The computer-readable storage medium of claim 19, wherein each of said business information objects further comprises a matrix.

26. The computer-readable storage medium of claim 19, wherein each of said translation map objects further comprises a property describing channel interface information.

27. The computer-readable storage medium of claim 19, wherein said predefined graphic symbol library comprises one or more computer-aided drawing templates.

* * * * *